US011461014B1

(12) United States Patent
Yadav et al.

(10) Patent No.: US 11,461,014 B1
(45) Date of Patent: Oct. 4, 2022

(54) MODIFYING FUNCTION POINTERS TO BACK UP APPLICATION DATA

(71) Applicant: EMC IP Holding Company LLC, Hopkinton, MA (US)

(72) Inventors: Sunil Yadav, Bangalore (IN); Matthew Buchman, Seattle, WA (US); Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 548 days.

(21) Appl. No.: 14/871,751

(22) Filed: Sep. 30, 2015

(51) Int. Cl.
*G06F 3/06* (2006.01)

(52) U.S. Cl.
CPC ............ *G06F 3/0619* (2013.01); *G06F 3/065* (2013.01); *G06F 3/0683* (2013.01)

(58) Field of Classification Search
None
See application file for complete search history.

(56) References Cited

U.S. PATENT DOCUMENTS

| 7,099,900 | B1* | 8/2006 | Bromley | G06F 11/1451 707/823 |
| 8,060,476 | B1* | 11/2011 | Afonso | G06F 11/1451 707/649 |
| 2011/0088027 | A1* | 4/2011 | Jelvis | G06F 9/4411 717/174 |
| 2011/0184908 | A1* | 7/2011 | Slater | G06F 11/1453 707/609 |
| 2012/0246472 | A1* | 9/2012 | Berengoltz | G06F 11/1448 713/165 |
| 2014/0059525 | A1* | 2/2014 | Jawa | G06F 21/53 717/162 |
| 2016/0203145 | A1* | 7/2016 | Haviv | G06F 11/1448 707/694 |
| 2016/0321140 | A1* | 11/2016 | Khurange | G06F 11/1448 |
| 2016/0378676 | A1* | 12/2016 | Uriel | G06F 3/0604 711/203 |

\* cited by examiner

*Primary Examiner* — Tracy C Chan
(74) *Attorney, Agent, or Firm* — Krishnendu Gupta; Nikhil Patel

(57) ABSTRACT

Techniques to back up data are disclosed. In various embodiments, a function pointer associated with a system call by an application is modified to point to a custom write function. A request to write application data is received at the custom write function. The application data is written to a backup destination based at least in part on a determination that the request is associated with invocation of a backup method of the application.

24 Claims, 4 Drawing Sheets

MODIFYING FUNCTION POINTERS TO BACK UP APPLICATION DATA

BACKGROUND OF THE INVENTION

The ability to back up and, if needed, restore the application data of critical applications may be very important to the continuity of a business or other enterprise. An application may be storing data in multiple places and in multiple formats. Typically, an application knows best how to retrieve and restore application data.

As a result, generally when a backup product wants to back up an application's data, the backup product calls or requests the application to get the data. Most applications dump their data at one or more staging locations specified by the backup product. The backup product typically reads the application data from the staging location(s), processes the data, and writes it to appropriate backup media and/or servers, etc.

When an application directly writes application data to the location (local or network) specified by the backup product, the backup product does not get chance to preprocess the data, e.g., to de-duplicate the data, encrypt the data, etc. In prior approaches, filter drivers, Virtual File Systems, and other complex mechanism to intercept system calls (WriteFile\ReadFile) have been used to intercept and preprocess application data for storage on backup media. Such prior approaches typically imposed a lot of overhead on the host, applications, and other resources.

BRIEF DESCRIPTION OF THE DRAWINGS

Various embodiments of the invention are disclosed in the following detailed description and the accompanying drawings.

DETAILED DESCRIPTION

Figure 1:
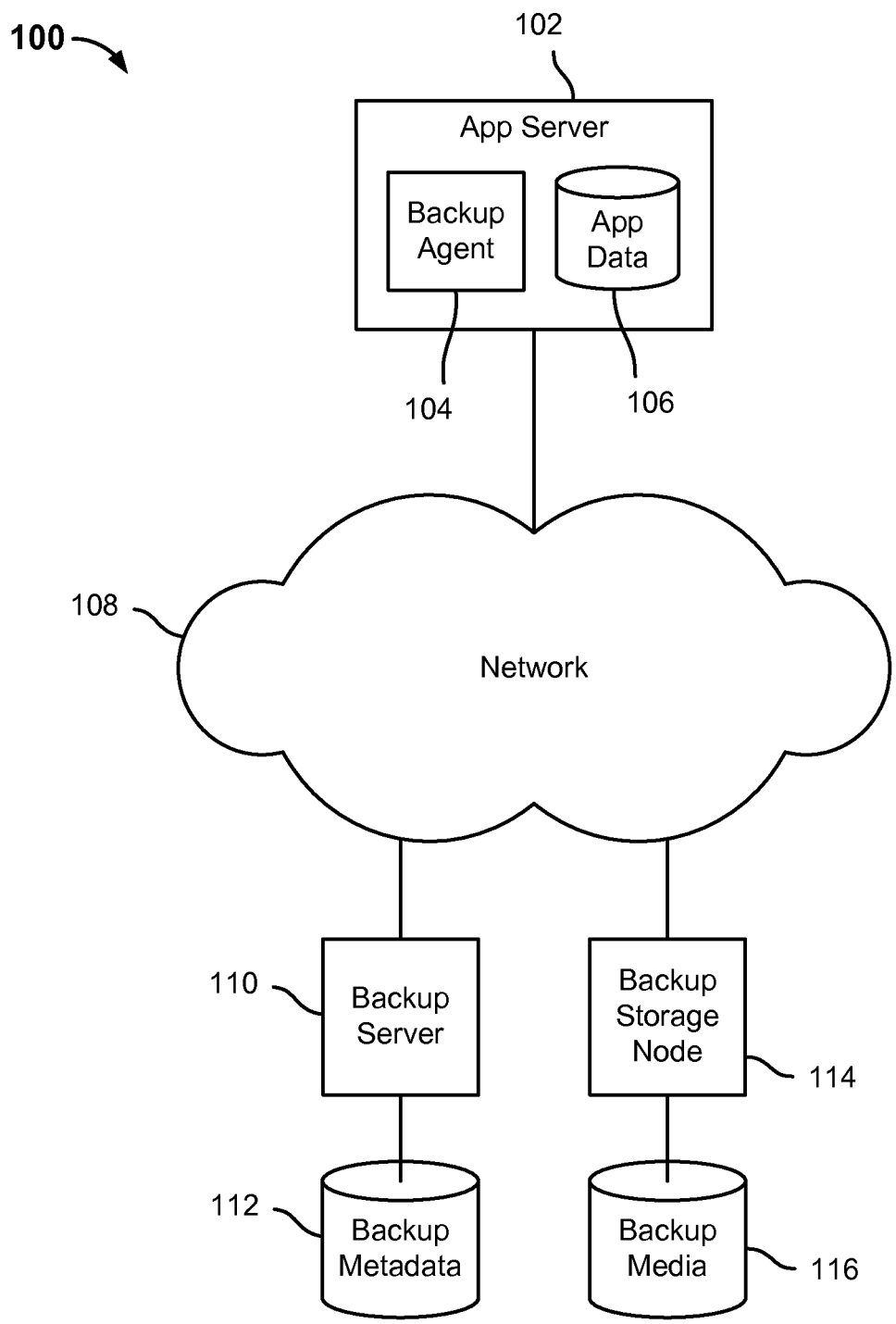
FIG. 1 is a block diagram illustrating an embodiment of a backup system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Modifying function pointers at runtime to cause application data written by the application in response to a backup request to be redirected to a custom function configured to write the application data directly to a desired backup location is disclosed.

In various embodiments, system calls may be intercepted in user mode. The system call may be intercepted in the same process which calls the backup interfaces of the application or remotely in the process of the application itself. In various embodiments, the application's function pointers associated with system calls are replaced with user defined functions at runtime.

When a backup product invokes the backup interface of an application, the backup method of the application ultimately will make a system call (e.g., to WriteFile) to write data to a destination file. In various embodiments, the pointer to this system call is replaced with a user defined function which has the same signature as the system call function it replaces. As a result, the user defined function would be invoked instead of the system function transparently to the application.

In various embodiments, the user defined function may be configured to write the application data directly to associated backup devices. The user defined function may be configured in various embodiments to perform desired processing of the application data while the data is "in flight", e.g., de-duplication, encryption, etc.

FIG. 1 is a block diagram illustrating an embodiment of a backup system and environment. In the example shown, an enterprise network environment 100 includes an application server 102 on which a backup agent or other backup client software 104 is installed. Backup agent 104 is configured in various embodiments to backup application data 106. Backup agent 104 communicates via network 108 with backup server 110, which uses backup metadata 112 to manage backups of data on associated backup clients, such as application server 102, and to keep track of the backed up data, e.g., in one or more index(es) comprising backup metadata 112. Backup agent 104 and backup server 110 may cooperate to cause data comprising or otherwise associated with application data 106, or other application data stored on other backup clients, to be backed up across network 108 to a backup storage node 114. Backup storage node 114 stores backup data on backup media 116, e.g., one or more hard disk drives, removable media such as tape media, etc.

In various embodiments, backup agent 104 and/or other client side code may be configured to modify function pointers associated with an application running on application server 102, e.g., function pointers of application-related processes which point to system functions, such as WriteFile or other write functions and/or write-related system calls. In various embodiments, function pointers may be rewritten at runtime to point to custom or replacement functions comprising and/or otherwise associated with backup agent 104. Such custom or replacement functions may be performed desired pre-processing, such as de-duplicating application data that is being backed up and/or encrypting application "in flight" prior to its being written to destination media and additional buffering or aggregation of the data in order to emulate relative low-latency response from read/write call as expected by the calling application. As such, custom replacement functions do not need to map one-to-one to original functions in their internal behavior, only in exposed functionality.

In various embodiments, the custom or replacement function may be configured to write directly to backup media, such as backup media 116, portions of application data 106 that is written by the application in response to a backup method of the application having been invoked.

In some embodiments, to back up application data 106 a list of files or other data objects may be generated, e.g., by backup agent 104 and/or backup server 110, and passed to the backup method of the application and also to the custom write function. The custom write function may be configured to use this list to determine which write function calls by the application have been made in response to a backup method of the application having been invoked. If a call is determined to have been made in response to a backup method of the application having been invoked, the associated data may be processed as backup data, e.g., pre-processed as applicable (e.g., de-duplication, encryption) and written directly to backup media 116. In some embodiments, if a call is determined to have been made by the application other than in response to a backup method of the application having been invoked, the call may be passed to the standard system function, e.g., the WriteFile or other write function comprising the operating system kernel.

Figure 2:
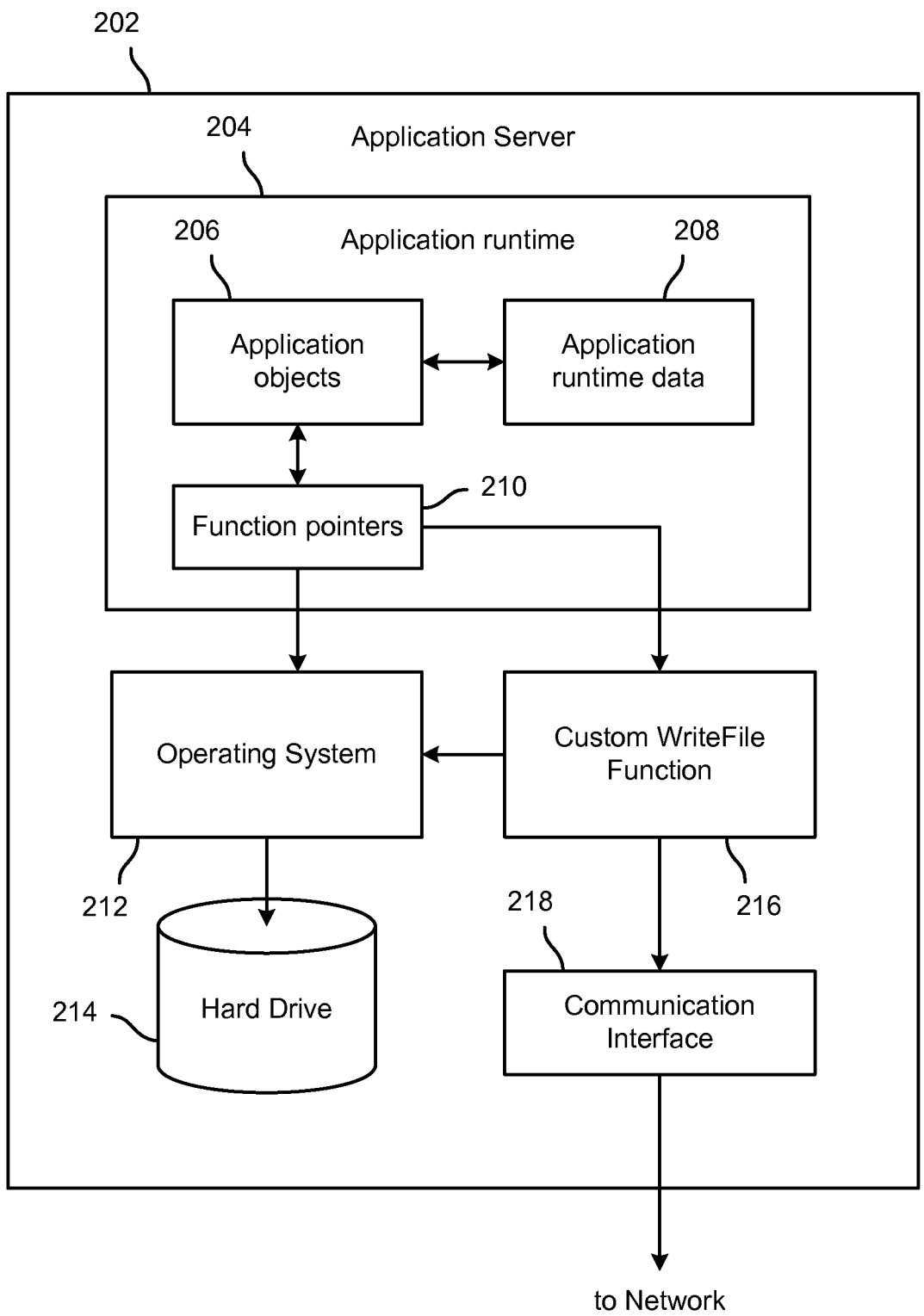
FIG. 2 is a block diagram illustrating an embodiment of an application server.

FIG. 2 is a block diagram illustrating an embodiment of an application server. In various embodiments, the application server of FIG. 2 may be used to implement the application server 102 of FIG. 1. In the example shown, application server 202 includes an application runtime environment 204 in which application objects 206 provide application-related functionality using application runtime data 208 stored in memory associated with application runtime 210. Application objects 206 may include methods that use function pointers 210 to make system calls to functions associated with operating system 212. For example, application objects 206 may include methods to use function pointers 210 to invoke a WriteFile or other write function associated with operation system 212, e.g., to cause application data comprising application runtime data 208 to be written to a file or other storage location, such as a location on hard drive 214, a network-connected location, etc.

In the example shown, one or more function pointers comprising function pointers 210 have been modified dynamically, at runtime, to point to a custom WriteFile (or other write) function 216. In some embodiments, modifying the function pointers 210 results in writes by application objects 206 being redirected to custom WriteFile function 216. In some embodiments, custom WriteFile function 216 may be configured to determine for each write requested by application objects 206 whether the write request is associated with invocation of a backup method of an application with which application objects 206 are associated. If a write request is determined to be associated with invocation of a backup method of the application, the data may be pre-processed (if applicable) and written directly to backup media at a remote node via communication interface 218. Otherwise, custom WriteFile function 216 may pass the request through to a corresponding standard WriteFile function of the operating system 212.

Figure 3:
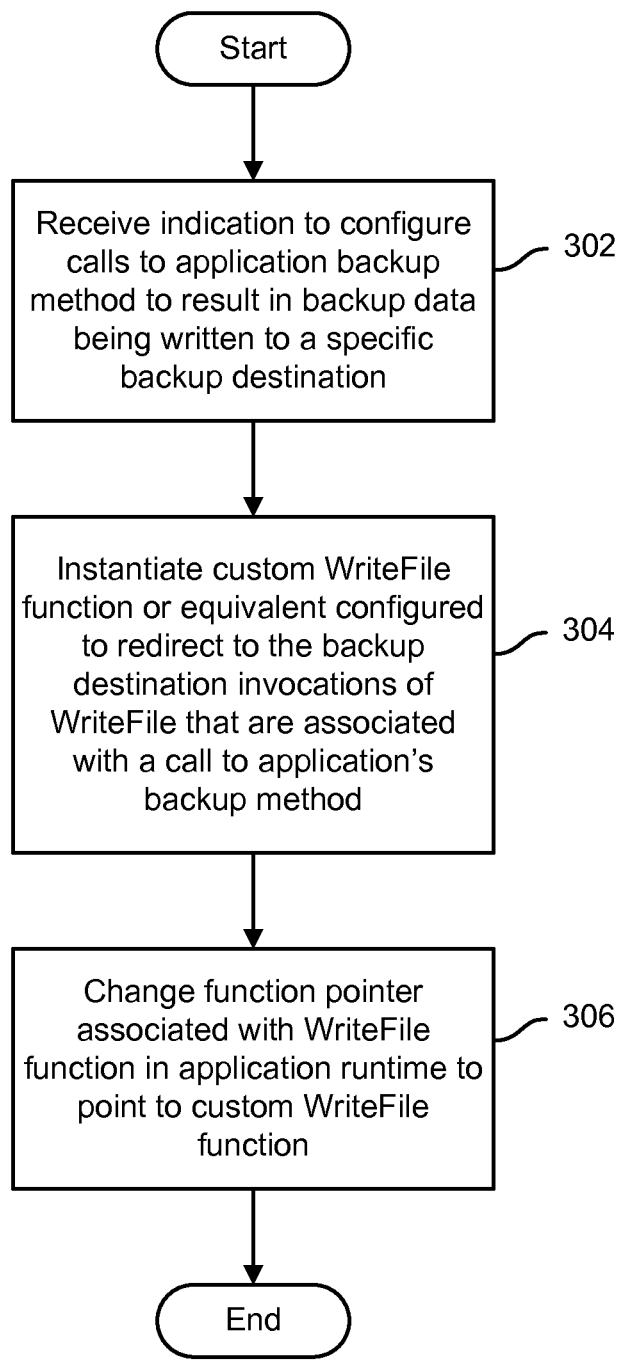
FIG. 3 is a flow chart illustrating an embodiment of a process to modify function pointers to facilitate backup of application data.

FIG. 3 is a flow chart illustrating an embodiment of a process to modify function pointers to facilitate backup of application data. In various embodiments, the process of FIG. 3 may be used to modify function pointers dynamically at application runtime, such as function pointers 210 of FIG. 2, to point to a custom or other replacement function, such as custom WriteFile function 216 of FIG. 2. In the example shown, an indication is received to configure calls to a backup method of an application to result in backup data being (optionally pre-processed and) written directly to backup media (or other specified backup destination) (302). A custom WriteFile function (or equivalent) that is configured to write directly to backup media (or another backup destination) write requests by the application that are associated with a call to a backup method of the application is instantiated (304). Function pointers associated with one or more runtime processes of the application are changed to point to the custom WriteFile function instead of the system function (306).

Figure 4:
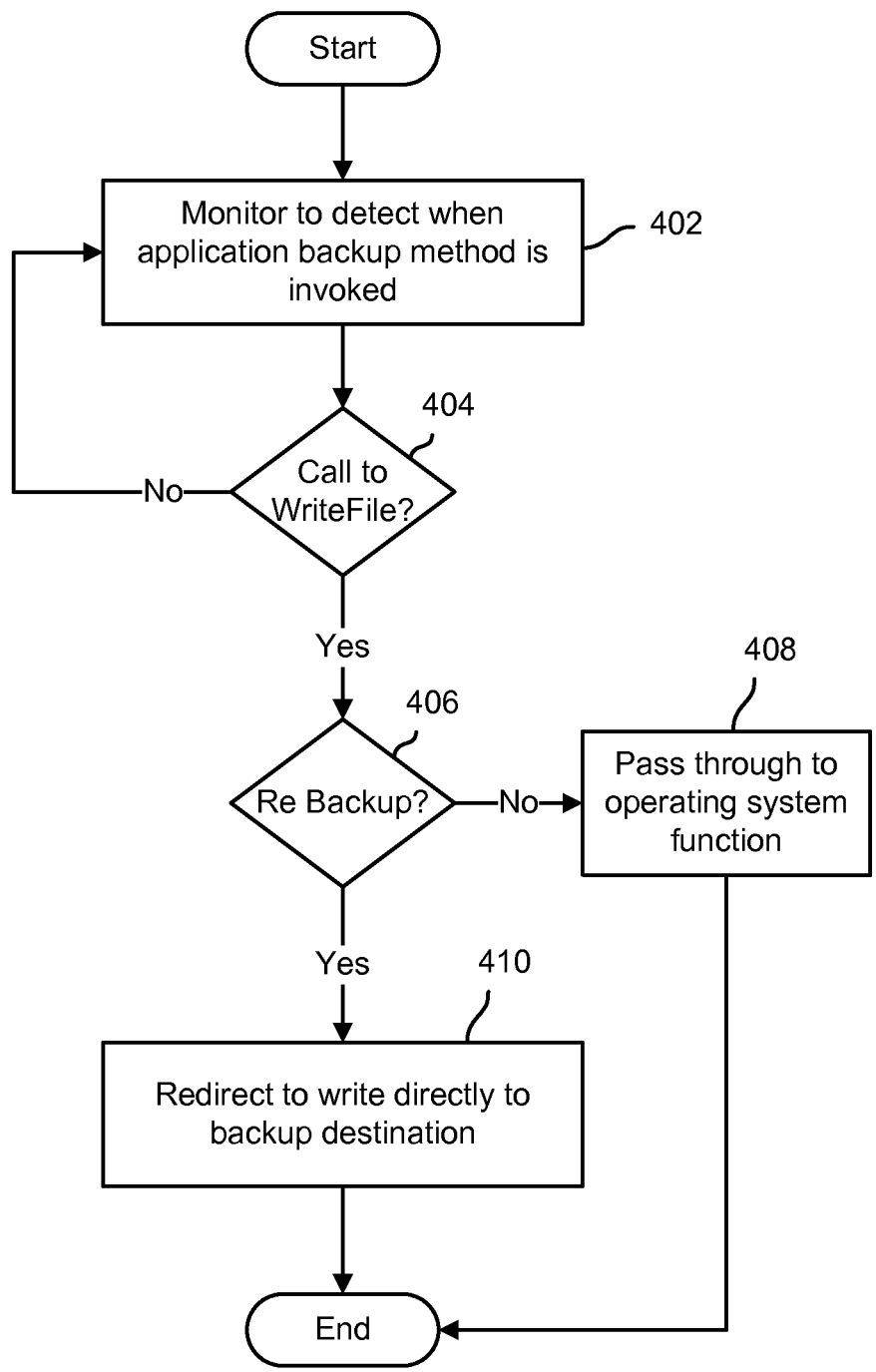
FIG. 4 is a flow chart illustrating an embodiment of a process to use modified function pointers to back up application data.

FIG. 4 is a flow chart illustrating an embodiment of a process to use modified function pointers to back up application data. In various embodiments, the process of FIG. 4 may be performed in whole or in part by a custom WriteFile (or other write) function, such as function 216 of FIG. 2. In the example shown, monitoring is performed to detect calls to a backup method of an application (402). For example, a list of files associated with a call to a backup method of the application may be created, received, and/or stored. For each call by a process associated with the application to the WriteFile function is received (404), e.g., at a custom WriteFile function such as function 216 of FIG. 2, it is determined whether the call is associated with invocation of the backup method of the application (406). If the call is determined to not be associated with invocation of the backup method of the application (406), the call is passed through to the operating system's implementation of the underlying function (408). If the call is determined to be associated with invocation of the backup method of the application (406), however, the data is (optionally pre-processed, e.g., de-duplication, encryption, etc. and) written directly to backup media (or another specified backup destination) (410).

The following non-limiting examples may be used in various embodiments to redirect function calls as disclosed herein:

In some embodiments, techniques disclosed herein may be used to back up application data comprising a Microsoft® SharePoint® site. SharePoint provides a Sites.Backup method which dumps data to the location specified in the arguments. For example, SPSiteCollection.Backup(string strSiteUrl, string strFilename, bool bOverwrite);

in which strFilename is the path where the data is dumped.

When a backup application invokes the above method, the method internally calls the WriteFile ( ) function. In various embodiments, techniques disclosed herein may be used to cause a custom WriteFile function, such as custom function 216 of FIG. 2, to be invoked instead of the standard system function, enabling data to be written directly to a backup device or other destination.

In some embodiments, the "Detour" library/tool provided by Microsoft® may be used to modify function pointers to point to a custom function. In other embodiments, a custom or other third party tool may be used. In some embodiments, the "Detour" tool may be used as follows:

Include the application's backup interfaces in the backup application, compile build, etc.
    Declare the function pointers for WriteFile and ReadFile system calls.
    Use the Detour library's following methods in your backup application at startup
    or wherever appropriate:
    DetourRestoreAfterWith( )
    DetourTransactionBegin( )
    DetourUpdateThread(GetCurrentThread( ));
    DetourAttach(&(PVOID&)TrueWriteFile, Custome_WriteFile);
        DetourTransactionCommit( );
    TrueWriteFile and Detoured WriteFile are defined as follows:
    static BOOL(WINAPI*TrueWriteFile)(_In_HANDLE hFile,
    _In_reads_bytes_opt_(nNumberOfBytesToWrite) LPCVOID lpBuffer,
    _In_DWORD nNumberOfBytesToWrite,
    _Out_opt_LPDWORD lpNumberOfBytesWritten,
    _Inout_opt_LPOVERLAPPED lpOverlapped
    )=WriteFile;
    BOOL WINAPI Custome_WriteFile(_In_HANDLE hFile,
    _In_reads_bytes_opt_(nNumberOfBytesToWrite) LPCVOID lpBuffer,
    _In_DWORD nNumberOfBytesToWrite,
    _Out_opt_LPDWORD lpNumberOfBytesWritten,
    _Inout_opt_LPOVERLAPPED lpOverlapped
    )
    {
    // do processing here- as per requirements of backup product return (TrueWritefile(hfile, lpBuffer, nNumberOfBytesToWrite, lpNumberOfBytesWritten, lpOverlapped));
    }
    Add logic (e.g., maintain a map of all files which should be saved to backup media and which should be skipped)

In various embodiments, techniques disclosed herein may be applied to any system call or calls to third party APIs. Techniques disclosed herein may be applied to other processes, e.g., through DLL injection in the running process.

Use of techniques disclosed herein may enable application data to be written directly to backup media (or other backup destinations) in response to invocation of a backup method of the application, without requiring more complicated techniques, such as filter drivers, to be used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of backing up data, comprising:
    modifying a function pointer associated with a system call by an application to point to a custom write function, wherein the custom write function comprises a function for writing corresponding data to a corresponding backup destination, and one or more pre-processing functions associated with backing up the corresponding data, and wherein the custom write function is configured to determine whether a corresponding request to write application data is associated with a backup method, and to perform the function for writing corresponding data to the corresponding data backup destination in response to determining that the corresponding request to write application data is associated with a backup method, and to perform a write function that is different from the function for writing corresponding data to the corresponding data backup destination in response to determining that the corresponding request to write application data is not associated with a backup method;
    receiving a request to write application data specified in the request;
    determining, using the custom write function, whether the request is associated with an invocation of a backup method of the application, comprising:
        obtaining a list of files to be backed up that are associated with a call to the backup method of the application; and
        determining whether the request corresponds to a file to be backed-up that is included in the list of files to be backed up;
    in response to determining that the request is associated with the invocation of the backup method of the application, using the custom write function in connection with writing the application data specified in the request, wherein the application data is written to the corresponding backup destination, and wherein at least one of the one or more pre-processing functions is performed before the application data is written to the corresponding backup destination; and
    in response to determining that the request is not associated with the invocation of the backup method of the application, using the write function that is different from the custom write function in connection with writing the application data specified in the request.

2. The method of claim 1, wherein the function pointer is associated with an application process associated with an application runtime environment.

3. The method of claim 1, wherein the custom write function comprises a user defined function.

4. The method of claim 1, wherein the custom write function is configured to pass through to a standard write function a write request by the application that is not associated with invocation of the backup method of the application, wherein the standard write function corresponds to the write function that is different from the custom write function.

5. The method of claim 1, wherein the one or more pre-processing functions include de-duplication processing.

6. The method of claim 1, wherein the one or more pre-processing functions include encrypting the application data.

7. The method of claim 1, wherein the backup destination comprises a location on backup media.

8. The method of claim 1, wherein the modifying the function pointer associated with the system call by the application to point to the custom write function comprises:
    replacing, at runtime, one or more function pointers of the application that are associated with one or more system calls with one or more user defined functions.

9. The method of claim 8, wherein at least one of the one or more user-defined functions further comprise the one or more pre-processing functions, the pre-processing functions being configured for performing a pre-processing of the application data associated with the corresponding request to write the application data.

10. The method of claim 1, wherein the custom write function writes the corresponding data directly to the corresponding backup destination.

11. The method of claim 1, wherein the custom write function determines to write the corresponding data to the corresponding backup destination based at least in part on a mapping of one or more files to backup media.

12. The method of claim 1, wherein the determination of whether the request is associated with an invocation of a backup method of the application, and the use of the custom write function in connection with writing the application data specified in the request in response to determining that the request is associated with the invocation of the backup method of the application are performed in a manner that is transparent to the application associated with the system call.

13. The method of claim 1, wherein respective exposed functionalities of the custom write function with respect to writing application data specified in a request associated with the invocation of the backup method and the write function are the same.

14. The method of claim 1, wherein the custom write function in connection with writing the application data specified in the request writes the application data directly to the corresponding backup destination in response to the determining that the request is associated with the invocation of the backup method of the application.

15. The method of claim 1, wherein the of files to be backed up is provided in connection with a request to write application data specified in the request.

16. The method of claim 1, further comprising:
storing mapping of files that are to be saved to the corresponding backup destination in response to the receiving the request to write the application data specified in the request,
wherein the determining whether the request is associated with the invocation of the backup method of the application is based at least in part on the mapping of files that are to be saved to the corresponding backup destination.

17. The method of claim 1, wherein the list of files to be backed up is based at least in part on a detection of one or more calls to the backup method of the application.

18. A system to back up data, comprising:
a memory; and
a processor coupled to the memory and configured to:
modify as stored in the memory a function pointer associated with a system call by an application to point to a custom write function, wherein the custom write function comprises a function for writing corresponding data to a corresponding backup destination, and one or more pre-processing functions associated with backing up the corresponding data, and wherein the custom write function is configured to determine whether a corresponding request to write application data is associated with a backup method, and to perform the function for writing corresponding data to the corresponding data backup destination in response to determining that the corresponding request to write application data is associated with a backup method, and to perform a write function that is different from the function for writing corresponding data to the corresponding data backup destination in response to determining that the corresponding request to write application data is not associated with a backup method;
receive a request to write application data specified in the request;
determine, using the custom write function, whether the request is associated with an invocation of a backup method of the application, comprising:
obtain a list of files to be backed up that are associated with a call to the backup method of the application; and
determine whether the request corresponds to a file to be backed-up that is included in the list of files to be backed up;
in response to determining that the request is associated with the invocation of the backup method of the application, use the custom write function in connection with writing the application data specified in the request, wherein the application data is written to the corresponding backup destination, and wherein at least one of the one or more pre-processing functions is performed before the application data is written to the corresponding backup destination; and
in response to determining that the request is not associated with the invocation of the backup method of the application, use the write function that is different from the custom write function in connection with writing the application data specified in the request.

19. The system of claim 18, wherein the function pointer is associated with an application process associated with an application runtime environment.

20. The system of claim 18, wherein the custom write function comprises a user defined function.

21. The system of claim 18, wherein the custom write function is configured to pass through to a standard write function a write request by the application that is not associated with invocation of the backup method of the application, wherein the standard write function corresponds to the write function that is different from the custom write function.

22. The system of claim 18, wherein the one or more pre-processing functions include de-duplication processing.

23. The system of claim 18, wherein the one or more pre-processing functions include encrypting the application data.

24. A computer program product to back up data, the computer program product being embodied in a non-transitory computer readable storage medium and comprising computer instructions for:
modifying a function pointer associated with a system call by an application to point to a custom write function, wherein the custom write function comprises a function for writing corresponding data to a corresponding backup destination, and one or more pre-processing functions associated with backing up the corresponding data, and wherein the custom write function is configured to determine whether a corresponding request to write application data is associated with a backup method, and to perform the function for writing corresponding data to the corresponding data backup destination in response to determining that the corresponding request to write application data is associated with a backup method, and to perform a write function that is different from the function for writing corresponding data to the corresponding data backup destination in response to determining that the corresponding request to write application data is not associated with a backup method;
receiving a request to write application data specified in the request;
determining, using the custom write function, whether the request is associated with an invocation of a backup method of the application, comprising:
  obtaining a list of files to be backed up that are associated with a call to the backup method of the application; and
  determining whether the request corresponds to a file to be backed-up that is included in the list of files to be backed up;
in response to determining that the request is associated with the invocation of the backup method of the application, using the custom write function in connection with writing the application data specified in the request, wherein the application data is written to the corresponding backup destination, and wherein at least one of the one or more pre-processing functions is performed before the application data is written to the corresponding backup destination; and
in response to determining that the request is not associated with the invocation of the backup method of the application, using the write function that is different from the custom write function in connection with writing the application data specified in the request.

* * * * *